Jan. 31, 1956  
G. P. HAMNER  
2,733,285  
RECOVERY OF HYDROCARBONS FROM HIGHLY CRACKED PETROLEUM FRACTIONS
BY DIMERIZING THE CYCLIC DIOLEFINS DISTILLING TO OBTAIN A
C₆-C₇ CUT, CLAY POLYMERIZING THE OLEFINS AND DISTILLING
TO OBTAIN A BENZENE RICH FRACTION  
Filed March 19, 1952
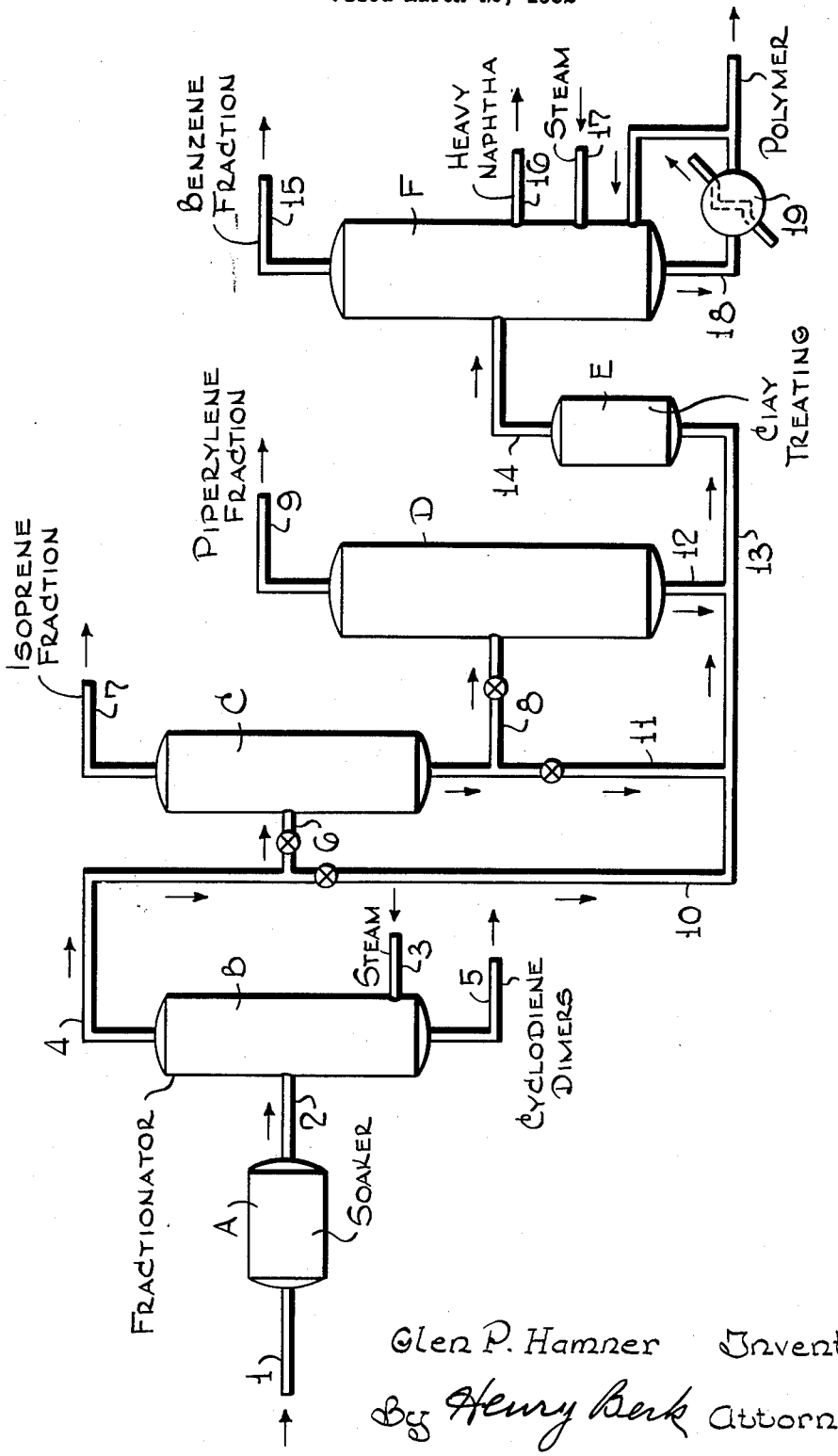
Glen P. Hamner Inventor
By Henry Berk Attorney United States Patent Office 2,733,285
Patented Jan. 31, 1956

2,733,285

RECOVERY OF HYDROCARBONS FROM HIGHLY CRACKED PETROLEUM FRACTIONS BY DIMERIZING THE CYCLIC DIOLEFINS DISTILLING TO OBTAIN A $C_6$—$C_7$ CUT, CLAY POLYMERIZING THE OLEFINS AND DISTILLING TO OBTAIN A BENZENE RICH FRACTION

Glen P. Hamner, Baton Rouge, La., assignor to Esso Research and Engineering Company, a corporation of Delaware Application March 19, 1952, Serial No. 277,423

1 Claim. (Cl. 260—674)

This invention relates to a process for separating different types of diolefins from an olefinic-aromatic hydrocarbon fraction to obtain high recovery of valuable diolefinic products while removing the diolefins from the aromatic fraction.

Light naphtha products from high-temperature and low-pressure cracking of petroleum naphtha through gas oil fractions contain large quantities of cyclic diolefins, acyclic diolefins, olefins and aromatics. The separation of each particular type of diolefin component from these complex naphthas cannot be obtained by conventional distillation.

Until recently, these complex naphthas were given an over-all clay treatment for removing as much of the diolefins as possible in the form of resinous polymers to leave the rest of the hydrocarbons more suitable for use in motor fuel. With the ordinary clay treatment imposed on the complex naphtha, the diolefins interpolymerize to form resinous polymers which in general have been dark in color, non-uniform in composition, and unstable, and therefore, of relatively low value.

In accordance with the present invention, a valuable separation of cyclic diolefins and certain acyclic diolefins can be achieved prior to a step of polymerizing the remaining diolefinic components to polymers of particular quality and with the advantage of insuring more complete separation of diolefins, especially conjugated $C_5$ and $C_7$ diolefins, from the aromatic hydrocarbon containing stream.

A schematic flow plan of the process is shown in the accompanying drawing. The main units in the order of their sequence as shown in the drawing are as follows:

A.—A thermal soaker for selective dimerization of the cyclic diolefins.

B.—A fractionating column operated to separate cyclic diolefin dimers as a residual fraction and removing the other hydrocarbons overhead.

C.—A fractionating column operated to separate an isoprene fraction overhead.

D.—A fractionating column operated to separate a piperylene fraction overhead.

E.—A higher temperature acyclic diolefin polymerization treating unit.

F.—A fractionating column for removing diolefin-free aromatic fractions overhead and recovering high molecular weight polymers as a bottoms product.

The thermal soaker A is charged with the naphtha fraction from line 1. In thermal soaker A, selective dimerization of the cyclic diolefin components, cyclopentadiene and methyl cyclopentadiene, is obtained with good control of the temperatures and residence period in the ranges of 180° F. to 240° F. and 6 to 20 hours.

The soaked liquid product is discharged from soaker A by line 2 into an intermediate part of fractionator B for separating resulting dimers mainly in the $C_{10}$ to $C_{12}$ range. With about 30 plates in column B, a pressure of the order of 0 to 5 p. s. i. g. may be maintained therein, and steam is preferably injected near the bottom, by line 3. Vapors are taken overhead by line 4 at about 160° to 170° F. while the temperature of the bottoms is maintained in the range of 260° to 300° F. The cyclodiene dimer product of $C_{10}$ to $C_{12}$ range is the bottom product withdrawn by line 5.

Fractionating column C receives overhead vapors or distillate from column B through line 6 when it is desired to separate an isoprene-containing fraction for recovery of pure isoprene. Column C is provided with about 50 plates, receives feed at about the 30th–35th plate, and is operated preferably under 30–35 p. s. i. g. to distill overhead vapors through line 7 at temperatures of 140° to 150° F. The bottoms can be heated in column C to temperatures of 225° to 235° F.

Column D receives bottoms from column C by way of line 8 when it is desired to remove piperylene by overhead line 9. Column D, provided with about 50 plates, receives feed on about the 30th plate and is operated under a pressure of about 30–35 p. s. i. g. The piperylene vapor fraction is taken off overhead from column D by line 9 at 160°–165° F. The bottoms are heated in column D to about 240°–245° F.

The polymerization treating unit E may receive the total overhead from column B bypassing columns C and D by line 10, and/or it may receive bottoms of column C by line 11 bypassing column D, and/or it may receive bottoms of column D from the line withdrawn by line 12 into feed line 13. Thus, the polymerizing unit E may receive any fraction of the overhead from column B depending on whether it is desired to remove isoprene and/or piperylene.

The treating vessel E is intended to serve a special purpose of polymerizing substantially all the reactive diolefins remaining in the stream entering this unit. The remaining diolefins thus entering unit E are mainly acyclic diolefins in the $C_5$–$C_6$ range except for the $C_5$ diolefins which would be separated by fractionation in columns C and D.

By maintaining the hydrocarbon stream in treating unit E at temperatures in the range of 240° to 400° F. for sufficient time practically all the diolefins can be polymerized to dimers and higher polymers. With the aid of a mild polymerization catalyst such as activated clay, acid treated clay, etc. and still at the above mentioned moderate temperatures, the polymerization can be made to go further toward the formation of higher molecular weight polymers, but can be controlled to prevent the formation of excessively high molecular weight resins which would be normally solid.

The effluent from the treating unit E will be the polymer product formed therein dissolved in a lower boiling liquid composed mainly of $C_5$ to $C_7$ olefins and the aromatic hydrocarbon, particularly benzene. This solution of the polymers is discharged through line 14 into the fractionating column F.

Fractionating column F is provided with about 30 plates, receives feed from line 14 at about the 13th plate, and is operated under a pressure of the order of 8 to 10 p. s. i. g. The overhead vapor fraction removed by line 15 at a temperature of about 200° to 205° F. contains the benzene from the initial feed and monoolefins but is substantially free of diolefins. It is very important that this stream be free of reactive diolefins and tertiary olefins for a number of reasons, including convenience in further recovering the benzene from this fraction.

An intermediate naphtha fraction may be withdrawn as a side stream through line 16 from column F. It is desirable to inject steam at line 17 into a bottom part of column F to aid in controlling the distillation.

A valuable polymer product is left as bottoms in column F at a temperature of 450° to 500° F., and this bottoms product is withdrawn through line 18. Numerous studies were made to determine the effects of eliminating each of the various diolefins and other components from the highly unsaturated-aromatic stream, particularly with regard to the quality of the polymer and products.

By using the procedure of the present invention, it was demonstrated that with or without separation of isoprene or piperylene the remaining acyclic $C_5$–$C_7$ diolefins could be satisfactorily polymerized into light colored polymers of high gravity and high unsaturation, providing the $C_5$–$C_7$ stream was first suitably freed of cyclic diolefins. It was found important to carry out the termal soaking in unit A for selective dimerization of the cyclic diolefins and separation of the resulting dimerized cyclic diolefins as described in reference to the fractionating column B. These precautions are taken to prevent the cyclic diolefins from passing onwardly into the subsequent units with the overhead vapors from column B.

EXAMPLE I

The overhead vapor fraction containing $C_5$–$C_6$ diolefins, olefins, and benzene substantially free of cyclic diolefins was sent directly to unit E where it was heated to 300°F. under pressure of 150 p. s. i. g. and it was passed through clay at a rate of 0.5 volume per volume of clay per hour. The effluent from the clay treatment was fractionized to separate the polymer product. A similar feed containing a few percent of cyclic diolefins was subjected to the same kind of clay treatment. The polymer produced from the stream containing cyclic diolefins and the feed from which the cyclic diolefins were separated compared as follows:

*Table I*

CLAY TREAT POLYMER PRODUCT

| Polymer Inspections | Feed with Cyclic-diolefins | Feed Without Cyclic-diolefins |
|---|---|---|
| Gravity, API @ 60° F | 8–12 | 16.3 |
| Color, Gardner, in diluent | 10–13 | 8 |
| Iodine No | 249 | 277 |
| Viscosity, Saybolt Universal (SSU) at 210° F | 193 | 120 |
| Non-volatile matter, Wt. Percent, 3 hrs | 87.4 | 86 |
| Yield, Wt. Percent | 12.5 | 6.5 to 7.0 |

The relative values indicate that a considerable difference can be made in the polymer product characteristics by controlling the cyclic-diolefin content of the feed to the clay treatment.

Extensive laboratory and plant investigations showed that factors forming parts of the present invention are highly important in achieving the objects of the present invention.

Comparative data was obtained by operating two clay treating drums in unit E used on stream.

The liquid feed stream was passed at a temperature in the range of 250° to 300°F. into one of the clay treating drums. The temperature of the clay bed was maintained in the range of 250°–400°F. The inlet pressure in the treating chamber was maintained at about 120 p. s. i. g. As a result of exothermic polymerization reaction, the temperature in the clay bed would rise about 30–50°F. The treated $C_5$–$C_7$ distillate leaving the clay treating drum was flashed into the subsequent fractionating tower F from which the benzene-rich stream was taken overhead, a heavy naptha was withdrawn as a side cut and the polymer was withdrawn as bottoms product. The polymer bottoms product was subjected to steam stripping for the removal of light components in the bottom part of the tower F. In order to provide adequate heat for the fractionation operation in tower F, it was necessary to maintain a temperature at the bottom of column F in the range of 500° to 700°F.; for example, with a reboiling system 19.

In undergoing polymerization at tempertures of 250°–400°F. the $C_5$–$C_7$ diolefins tend to form dimers, trimers, and the higher polymers which are of main interest in using a catalyst such as clay for aiding the thermal polymerization.

The higer polymer products which are of value are viscous oils, perferably with Saybolt universal viscosity of 100–200 seconds at 210° F. These oils possess rapid drying properties if they have sufficient unsaturation, preferably with a minimum iodine number of 190 as compared to iodine numbers of 160 to 190 for linseed oil and tung oil. In printing inks these polymer oils have the advantage of being lower in price, yet giving shorter drying time as compared to drying oils of vegetable oil origin. To be of improved quality the polymer oils should also be made as free as possible of cracked hydrocarbon odor and free of dark color.

It was observed that when the feed to the polymerizing unit E included large amounts of the various $C_5$ diolefins, difficulty was experienced in controlling the treating temperatures. The polymerization rate was fast and erratic causing the temperatures to tend to rise in different parts of the polymerization zone up above 400°F. There was also noted to be a tendency of the $C_5$ diolefins to make the polymer oil product excessively high in viscosity; for example, approximately twice the viscosity which was obtained by having the feed relatively free of the $C_5$–$C_6$ cyclodienes and of isoprene.

On the other hand further studies show that unstable polymer oils were obtained if all the conjugated diolefins were removed prior to a clay treatment. For example, when the $C_5$–$C_7$ feed stock was first freed of diolefins by reaction with maleic anhydride under optimum conditions of about 1 hour contact time at 100 p. s. i. g. and at an average of 350°F. and the resulting diolefin-free feedstock was treated with clay, the polymer yield was lowered from 10.8% to 6.6%, the iodine number was decreased to about 160, and the viscosity was extremely high, 2990 seconds at 210°F., Saybolt. Thus it was demonstrated that a certain concentration of diolefins is necessary and this is best supplied by the $C_6$ to $C_7$ conjugated acyclic diolefins which boil in the range of 154°F. to about 176°F.

In general, tests show that the yield of the polymer oil decreases as the feed rate increases. The treating time depends upon the activity of the polymerizing catalyst or clay used in polymerizing at temperatures of 250° to 400°F. Without any catalyst, thermal polymerization takes place, but in favor of high yields of dimers rather than the viscous polymer oils. The thermal polymerizations, in general, requires a period of 6 to 20 hours, whereas the catalyzed polymerization takes place in less than 6 hours, preferably in about 30 minutes to 1 hour. The rate of polymerization, of course, increases with the treating temperature but starting at about 400°F. the increased treating temperature causes the polymer oil to become darker in color, lower in iodine number, and lower in viscosity, even though the polymer yield becomes substantially increased. This would indicate that the higher temperature treatment tends to bring about polymerization or reaction of different components, other than the conjugated diolefins.

In line with what was observed regarding temperatures during the treatment, tests showed that the qualities of the polymer oils can be adversely affected if they become heated to excessively high temperatures during the subsequent stripping operation. The polymer oil begins to go rapidly off color when it is exposed to temperatures of about 575° F. The oil also begins to acquire an increased odor and undergo other changes. Such changes may occur during the stripping of the polymer oil which essentially requires exposure of the oil to high temperatures in the range of 500° F. to 700° F., but the amount of change occurring will depend upon the composition of the polymers. The polymers formed largely from cyclic diolefins and $C_5$ diolefins will tend to undergo thermal decomposition at temperatures of the order of 500° to 700° F. Tests were made on various feed stocks with successive polymerization treatments using a clay catalyst at treating temperatures of 350°–400° F. After each clay treatment the effluent naphtha hydrocarbons containing the dissolved polymers were subjected to steam stripping to remove the polymer oil, and the remaining $C_5$–$C_7$ hydrocarbons were given a repeated clay treatment. The initial polymer products recovered were the highest quality with respect to color, viscosity and iodine number. This showed that while it was possible to increase the total amount of polymer oil in successive clay treatments followed by removal of the polymer oil after each treatment, the naphtha hydrocarbons separated from the polymer oils after each treatment become excessively deficient in the type of diolefins which give the desired quality to the polymer oils.

Broader aspects of this invention are claimed in co-pending application Ser. No. 245,563, filed September 7, 1951, and now allowed. A variation using phosphoric acid polymerization instead of clay polymerization and intended to facilitate production of a high purity benzene fraction is claimed in co-pending application Ser. No. 277,421 of even date herewith.

What is claimed is:

In a process for recovering valuable hydrocarbon fractions from a cracked $C_5$ to $C_7$ petroleum naphtha fraction which contains $C_5$, $C_6$, and $C_7$ cyclic diolefins as well as $C_5$, $C_6$, and $C_7$ acyclic diolefins along with other relatively saturated hydrocarbons and benzene, the improvement which comprises heating the naphtha fraction to a temperature in the range of 180° to 240° F. to selectively dimerize said cyclic diolefins present, separating the heated naphtha fraction into a heavy cut containing the resulting cyclic diolefin dimers, a distillate cut containing said $C_5$ acyclic diolefins and a residual naphtha fraction containing said $C_6$ and $C_7$ acyclic diolefins but relatively free of cyclic diolefins and said $C_5$ acyclic diolefins, subjecting said $C_6$–$C_7$ acyclic diolefin-containing naphtha fraction to polymerization in liquid phase at a temperature in the range of 250° to 400° F. with the aid of a clay catalyst, passing remaining naphtha with the resulting polymers into a fractionation zone, distilling a benzene-rich fraction from said naphtha, simultaneously stripping said polymers of naphtha at a temperature below 575° F., and recovering said stripped polymers.

References Cited in the file of this patent

UNITED STATES PATENTS

| | | |
|---|---|---|
| 2,222,128 | Wagner | Nov. 19, 1940 |
| 2,232,761 | Balthis | Feb. 25, 1941 |
| 2,366,570 | Souders et al. | Jan. 2, 1945 |
| 2,400,355 | Jones et al. | May 14, 1946 |
| 2,400,802 | Arnold | May 21, 1946 |
| 2,414,651 | Latchum | Jan. 21, 1947 |
| 2,636,056 | Jones | Apr. 21, 1950 |